Oct. 24, 1967 K. W. MEALING 3,348,699
LADDER-TYPE RACK, AS FOR PASSENGER VEHICLES
Filed Dec. 28, 1965
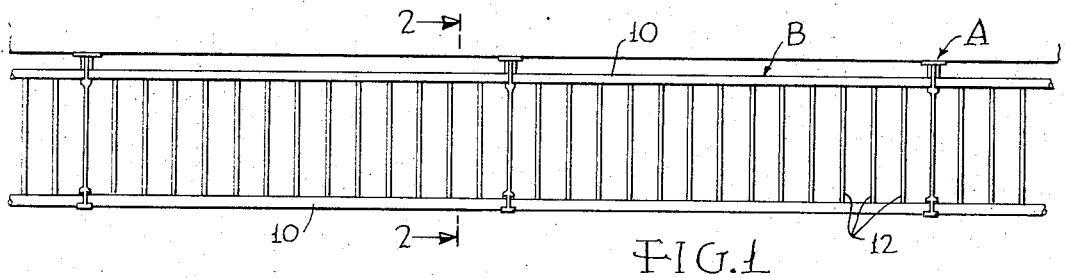
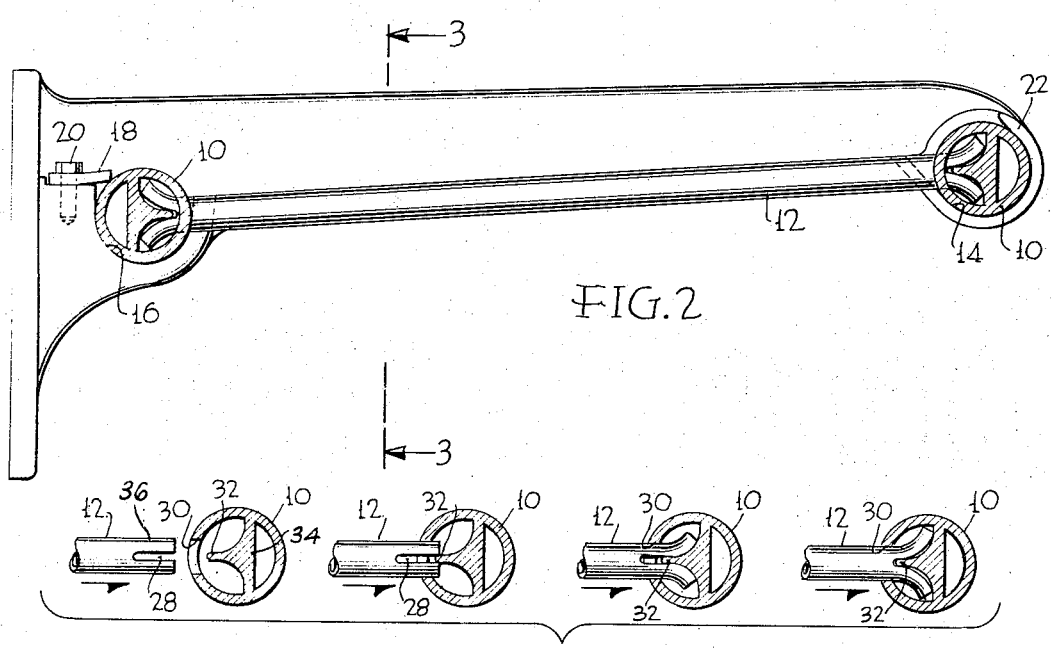
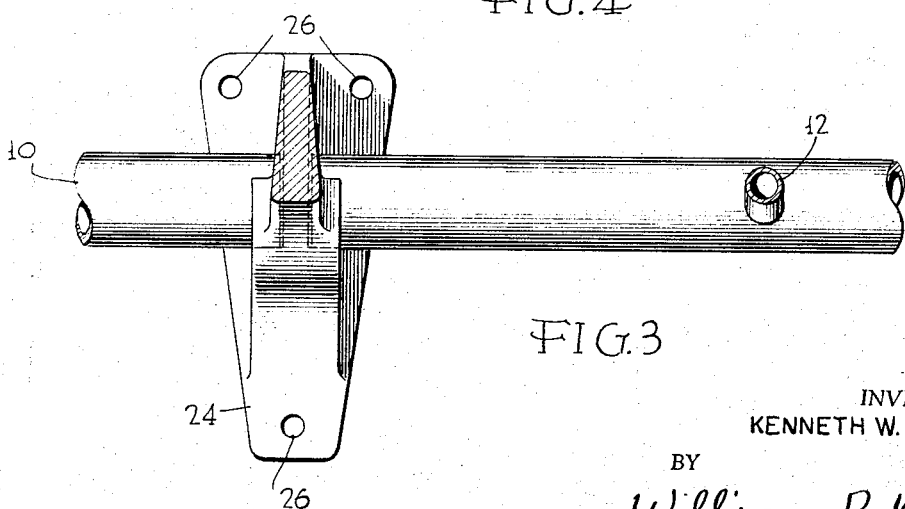
INVENTORS
KENNETH W. MEALING
BY
William R. Nolte
AGENT

United States Patent Office 3,348,699
Patented Oct. 24, 1967

3,348,699
LADDER-TYPE RACK, AS FOR PASSENGER VEHICLES
Kenneth W. Mealing, Bucks County, Pa., assignor to The Budd Company, Philadelphia, Pa., a corporation of Pennsylvania
Filed Dec. 28, 1965, Ser. No. 516,993
4 Claims. (Cl. 211—90)

This invention relates to a ladder type rack or shelf, particularly for supporting articles, such as luggage and the like, in passenger vehicles, and has for an object the provision of improvements in this art.

One of the particular objects of the invention is to provide a rack which is formed of few and simple parts.

Another object is to provide a ladder-type component or unit, comprised of spaced side rails and spaced rungs, which can be easily formed and assembled in any desired length, cut into lengths if needed, and assembled with standard brackets which are spaced as required.

Another object is to provide a ladder unit which is rigid; assemblable with its own components without added bolts, screws, pins, or the like; firmly held together and free from rattle or other noise after assembly; assemblable with brackets in a simple and expeditious manner; and which is of a neat appearance.

Another object is to provide a ladder-type rack unit or component in which the rungs are held against turning in the side rails.

Another object is to provide a ladder-type unit or component in which the rungs are secured in the rails by expansible elements on the rungs, thus providing that the rungs can be secured to the rails by inserting their ends into holes in the rails and compressing the rails against the ends of the rungs.

Another object is to provide a ladder-type unit or component comprised of parts or elements which can be formed by extrusion.

Another object is to provide a ladder-type unit in which the rails are provided interiorly with longitudinally extending wedge elements for expanding the ends of the rung elements, these being split for being expanded by spreading them apart.

Another object is to provide the rails with through-running interior core elements which provide the wedge elements and at the same time aid in stiffening the rails, particularly if the core elements fit tightly in the rails or are formed integrally with the rails.

The above and other objects of the invention, as well as various features of novelty and advantages, will be apparent from the following description of an exemplary embodiment, reference being made to the accompanying drawings, wherein:

FIG. 1 is a top plan view of a rack embodying the invention;

FIG. 2 is an enlarged vertical transverse section taken on the line 2—2 of FIG. 1;

FIG. 3 is a vertical section taken on the line 3—3 of FIG. 2;

FIG. 4 is an action diagram showing the end of a rung being secured to a rail.

The rack comprises two main units or components, namely, bracket units A and ladder-type article supporting units B. The ladder-type units, or simply ladders, comprise side rails 10 and rungs 12 secured to the side rails. The brackets B are provided with sockets 14 and 16 at the outer and inner ends, respectively, for receiving the outer and inner rails, respectively, of the ladder unit. At the inner end there are keeper means, such as a plate 18 and clamp screws 20 therefor, which grip the inner rail in the inner socket 16. The outer socket 14 has an overhanging portion 22 which holds the outer rail against vertical release, thereby making the inner keeper clamping means above adequate for holding the ladder unit firmly on the bracket. The plate 18 engages the upper side edge of the round-section rail thus producing a forward wedging action which forces the front rail tightly in its socket while at the same time forcing the rear rail down in its socket. The bracket is provided with a base 24 having fastener holes 26 for securing it to a wall.

As shown in FIGS. 2 and 4, the rungs 12, which preferably are tubular, have a slit 28 formed in the end, as by a saw cut providing spaced elements on the end, and are inserted in holes 30 formed in the side of a rail. The rail interiorly is hollow and provided with a longitudinally disposed wedge-shaped element 32 which engages in the end of the slit 28 as the end of the rung is forced into the hole in the side rail. The wedge-shaped element 32 is preferably formed on a through-running bar element 34 provided within the tubular rail. Since the rail stock, like the rung stock, can conveniently be formed by extrusion, especially if made of aluminum, the preferred material, the longitudinal bar element is preferably made integral with the tubular portion of the rail stock. The holes 30, of course, are drilled later, being located by observing the end of the rail and securing the rail in such position for drilling that the holes will be properly located.

The first stage of rung securement in a rail is shown at the left of FIG. 4, the rung 12 there being shown to be entering a hole 30. Next, to the right, the slit 28 of the rung is shown to be in opposition to the edge of the wedge-shaped element 32. Next, the side elements 36 of the bifurcated end of the rung are shown as being spread apart by the wedge-shaped element 32 within the rail. Lastly, to the right, the elements 36 are shown as having been fully spread apart to tightly hold the rung in the rail. The sides of the wedge-shaped element 32 are curved outwardly to cause the ends of the bifurcated elements 36 to be directed radially and, in the final position, to engage the inner sidewall of the tubular rail. This provides for accurate positioning when the parts are fully engaged, that is, when the rung is fully pushed home in the rail. When the ends of the rungs are all fully engaged with the rails at the opposed rung ends, the rails will be spaced apart exactly as intended.

Normally, the rungs are engaged with bars at both ends but there may be constructions which require engagement of only one end. Also, the spaced rails are usually parallel, as shown, but they may have other dispositions.

In assembling a ladder section, it may be convenient to assemble all rungs of a ladder unit in the holes of oppositely disposed rails and to force the rails together to secure all of the rungs in both rails in one operation. This will be especially the case for volume production when big presses are available.

It is thus seen that the invention provides a simple, efficient and easily fabricated rack construction. There need be only two extruded forms, one for the rails and one for the rungs. These may be made in any convenient lengths and cut into any desired lengths. The rails are drilled and the ends of the rungs are slitted and the parts are ready for assembly, as described, no bolts, screws, pins, or other extraneous fastening means and no other operations being required. It is also possible to make ladder units of indefinite length and later cut them into desired shorter lengths. Further, short lengths can be joined by using insert elements between their hollow ends.

If it should ever be necessary to separate the rungs from the rails, this could be done by pulling on the rails with sufficient force. This is possible because the rung ends are not locked in the rails in such a way as to be broken when pulled out. However, such separation will not normally be contemplated.

While one embodiment of the invention has been described for purposes of illustration, it is to be understood that there may be various embodiments and modifications within the general scope of the invention.

I claim:

1. A ladder-type rack, comprising in combination, spaced supporting means including brackets and a ladder-type unit supported on said brackets, said ladder-type unit comprising a pair of spaced apart hollow-section side rails and longitudinally spaced rungs, each rung being secured at each of its opposite ends at a joint in a hole in a side rail of said pair of side rails, the joint for the opposite end of each rung comprising a wedge element having sides defining an edge provided in the rail with said edge facing said hole, and bifurcation elements on said opposite end of each rung being spread apart on said sides of said wedge element, the wedge elements for all of the joints of a side rail being formed on a through-running bar element within said rail.

2. A ladder-type rack as set forth in claim 1, wherein each rail of said pair of hollow section side rails include an outer wall and wherein said bar element is formed integrally with said outer wall.

3. A ladder-type rack as set forth in claim 1, wherein said sides of said wedge element are concave to cause the ends of the bifurcation elements after assembly to be directed outwardly and generally at right angles to the axis of the rung.

4. A ladder-type rack as set forth in claim 1, wherein said bracket includes a pair of spaced sockets, one socket thereof having an overhang and securing an end of one of said side rails, the other socket including securing means associated therewith to receive and hold down an end of the other side rail of said pair of side rails, said overhang of said one socket serving to hold said one side rail when said other side rail is secured in said other socket by said securing means.

References Cited

UNITED STATES PATENTS

| 2,467,668 | 4/1949 | Hallberg. | |
| 2,887,802 | 5/1959 | Burmeister | 40—130 |
| 3,072,402 | 1/1963 | McCombs | 272—74 |
| 3,073,627 | 1/1963 | Ritter | 285—222 |

FOREIGN PATENTS 941,710   8/1948   France.

ROY D. FRAZIER, *Primary Examiner.*

W. D. LOULAN, *Assistant Examiner.*